United States Patent
Fratini et al.

(10) Patent No.: US 6,456,914 B1
(45) Date of Patent: Sep. 24, 2002

(54) METHOD OF DETERMINING A VEHICLE STEERING WHEEL ANGLE

(75) Inventors: Albert V. Fratini, Evanston, IL (US); David A. Shal, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/789,255

(22) Filed: Feb. 20, 2001

(51) Int. Cl.$^7$ .................................................. B62D 6/00
(52) U.S. Cl. ........................ 701/41; 701/43; 280/1.195; 280/1.202; 180/6.2
(58) Field of Search .............................. 701/41, 43, 36, 701/29; 280/1.195, 1.202; 180/6.2; 307/9.1, 10.1

(56) References Cited

U.S. PATENT DOCUMENTS

| 5,248,939 | A | * | 9/1993 | Brauer ........................ 324/174 |
| 5,343,392 | A | * | 8/1994 | Ishizakawa ............ 364/424.03 |
| 5,422,810 | A | * | 6/1995 | Brunning et al. ...... 364/424.05 |
| 5,857,160 | A | * | 1/1999 | Dickinson et al. ............ 701/41 |

* cited by examiner

*Primary Examiner*—Yonel Beaulieu
(74) *Attorney, Agent, or Firm*—Scott A. McBain (57) ABSTRACT

A method of determining a vehicle steering wheel angle by receiving at least one steering sensor output from at least one steering sensor. The method then receives a vehicle speed signal. A centered steering angle is determined based on the received vehicle speed signal and the steering sensor output.

28 Claims, 4 Drawing Sheets

METHOD OF DETERMINING A VEHICLE STEERING WHEEL ANGLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD OF THE INVENTION

In general, the invention relates to controlled vehicle systems. More specifically, the invention relates to steering angle information utilized within varying vehicle systems and, in particular, to a method for providing initialization and the accurate angle sensing of steering direction (also known in the art as steering angle, steering wheel angle, and steering hand wheel angle).

BACKGROUND OF THE INVENTION

Modern automotive technologies utilize advanced system algorithms to provide for advanced vehicle safety, comfort, control, and additional like attributes. These algorithms rely upon driver response, driver preferences, vehicle sensor output, hardcoded constants, and determined variables as input for processing the preferred function. An algorithm's result is then relayed for utilization within the pertinent system. Many of these algorithms rely upon the values defined by each other as inputs to be processed for additional controls. One value often required by alternate algorithms is for a vehicle's precise steering wheel center or steering wheel angle off center.

Prior art 'steering angle determination' algorithm's provide accurate results, but at a cost. One such cost involves the quality of a 'steering angle determination' algorithms result. Current 'steering angle determination' algorithms rely upon dedicated steering sensors. If more than one algorithm needs a raw steering wheel angle value, multiple sensors must be added thus increasing manufacturing costs.

Additionally, current 'steering angle determination' algorithms require three or more driver or sensor inputs such as yaw rate and lateral acceleration in addition to the steering sensor, in order to accurately determine a steering angle. Statistically, the larger the number of required input's, the higher the probability of inaccurate results caused by faulty driver input or malfunctioning sensors. Additionally, the larger the number of vehicle sensors, the higher the vehicle costs of manufacturing.

In addition, current 'steering angle determination' algorithms can hamper the proficiency of additional vehicle algorithms. This can be caused by the amount of time required for the steering sensor and additional sensors to provide sufficient data for the 'steering angle determination' algorithm to accurately determine the angle of a steering wheel from center.

Therefore, it would be desirable to have an algorithm that quickly determines absolute steering wheel angle information, that requires a minimum number of inputs, and that further improves upon the above-mentioned situations and prior art.

SUMMARY OF THE INVENTION

One embodiment of the invention provides a method of determining a vehicle steering wheel angle. At least one steering sensor output and a vehicle speed signal are received. A centered steering angle is determined based on the received vehicle speed signal and the steering sensor output.

Another embodiment of the invention provides a system for determining a vehicle steering angle including a means for receiving at least one steering sensor output, a means for receiving a vehicle speed signal, and a means for determining a centered steering angle based on the received vehicle speed signal and the steering sensor output.

Another embodiment of the invention provides a computer readable medium storing a computer program comprising computer readable code for receiving at least one steering sensor output. The computer program further comprises computer readable code for receiving a vehicle speed signal and for determining a centered steering angle based on the received vehicle speed signal and the steering sensor output.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE INVENTION

'Steering wheel angle determination' methods and systems are not new to the art, but prior art algorithms required vehicle information in excess of a vehicle speed, and the information provided by a steering sensor as its output. In addition to one embodiment of the present invention limiting the requiring vehicle variables to the vehicle speed and multiple steering sensor output values, an additional embodiment may utilize the vehicle speed and a single digital steering sensor output value.

Figure 1:
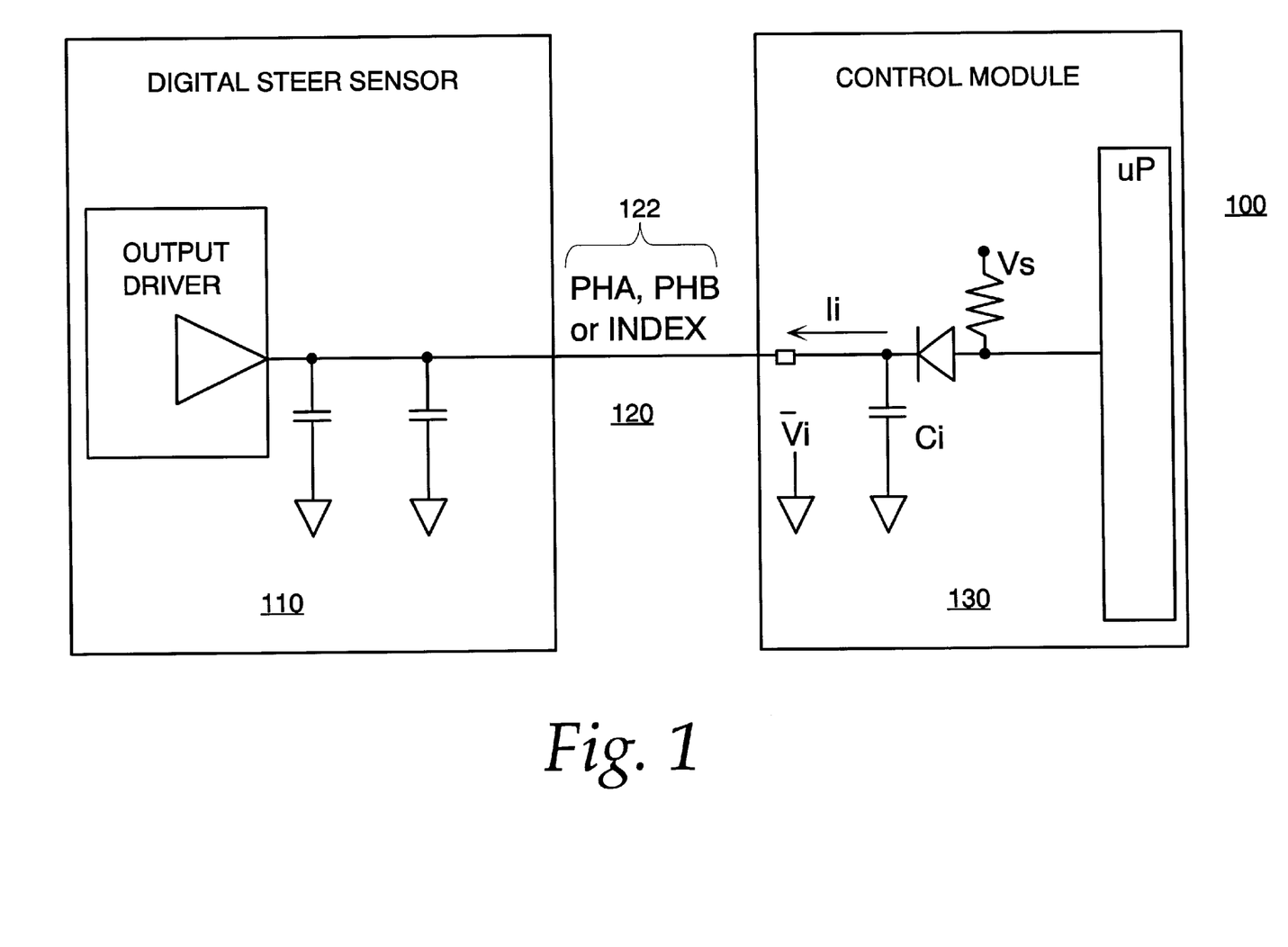
FIG. 1 is a schematic view of one embodiment of a steering wheel angle system, in accordance with the invention.

FIG. 1 is a schematic view of one embodiment of a vehicle steering wheel angle system 100 including a 'digital steering sensor' 110, a 'control module' 130, and a common communication path between them 120 as is known in the art. In one embodiment, the 'digital steering sensor' 110 is a quadrature sensor known in the art and provides a phase A (PHA), phase B (PHB), and index (INDEX or steering index) signal 122 output (pulses). An additional embodiment may use an analog steering sensor providing analog values of like output. The output signals 122 carried across the communication path 120 can become the input to one embodiment of a 'steering angle determination' algorithm, imbedded within the 'control module' 130. The 'steering angle determination' algorithm' is also known in the art as a 'SAD' algorithm, and is further illustrated in FIG. 2 as module 200. Further embodiments of the invention may refer to algorithms as modules or as the algorithm name without the specification 'algorithm'.

Figure 2:
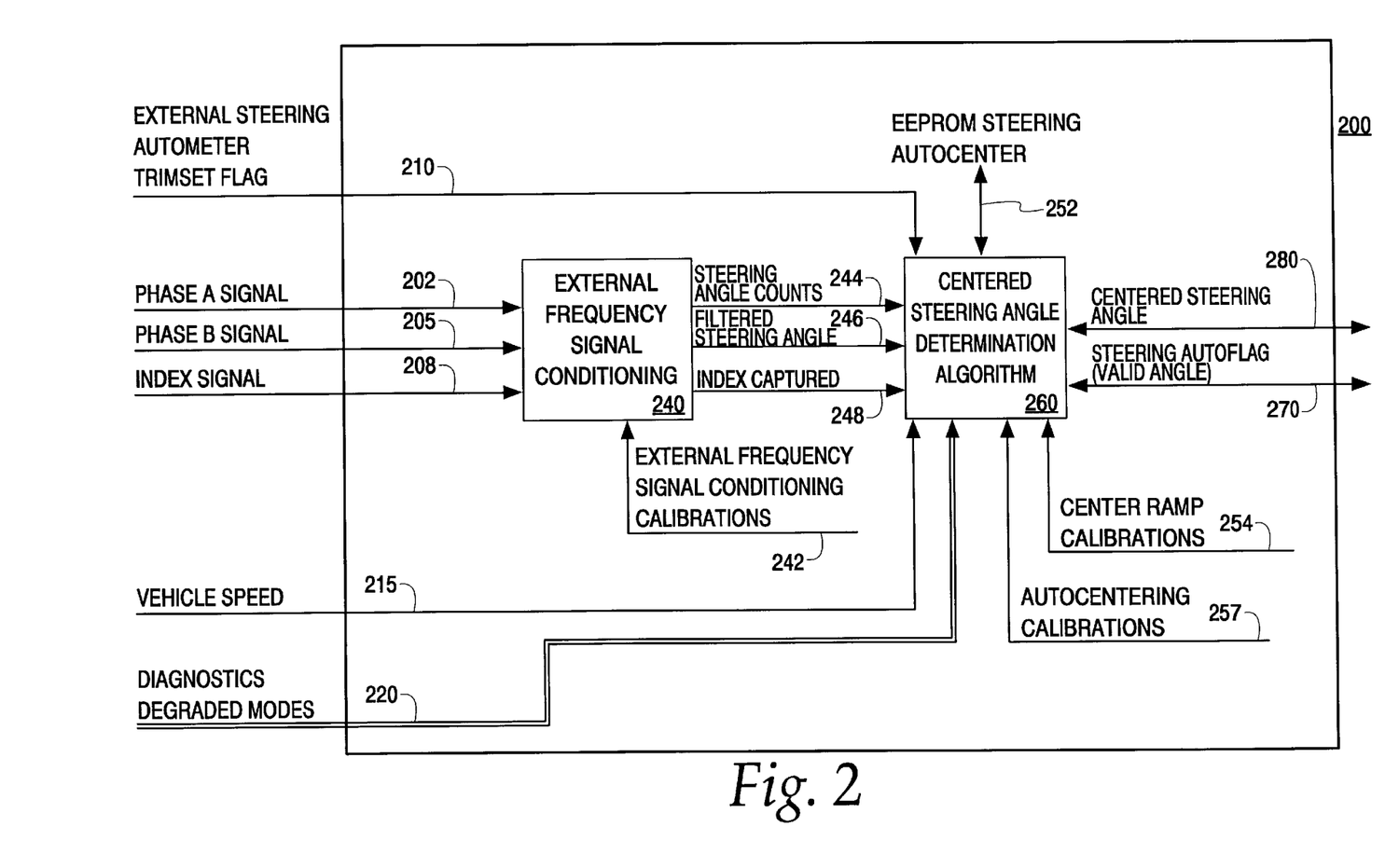
FIG. 2 is a block diagram of one embodiment of a 'steering angle determination' algorithm imbedded in the steering wheel angle system of FIG. 1 in accordance with the invention.

The 'SAD' algorithm 200 defines the software requirements for the 'control module' 130 to produce as outputs, a centered steering wheel angle (centered steering wheel angle) 280 and a steering autoflag 270 from the digital steering sensor output 122. In an alternative embodiment, the 'SAD' algorithm may be used as a 'Black Box', with all inputs and outputs defined generically and without consideration for any necessary external processing, thereby allowing for the use of the 'SAD' algorithm output by any type or number of vehicle control module. The term 'Black Box' is one known in the art to refer to a stand alone application who's output may be used by any other application without prejudice.

The 'SAD' algorithm 200 inputs can include continuous, external, and discrete inputs. The continuous input to the 'SAD' algorithm can include the 'vehicle speed' 215. The external inputs to the 'SAD' algorithm can include the 'steering phase A pulse' 202, the 'steering phase B pulse' 205, and the 'steering index pulse' 208. The discrete (flag variable) inputs to the 'SAD' algorithm 200 can include a 'diagnostics degraded modes' 220, and a 'external steering autocenter trimset' 210.

The 'diagnostics degraded modes' 220 is shown as an alternate embodiment wherein sensors or logic, determine if any fault occurs within the inputs to the 'SAD' algorithm 200. If a fault is indicated by the 'diagnostics degraded modes' 220, appropriate portions of the 'SAD' algorithm 200 can be overwritten.

Additional external inputs to the 'SAD' algorithm 200 can include a 'EEPROM steering autocenter' 252, a 'external frequency signal conditioning calibrations' 242, a 'center ramp calibrations' 254, and an 'autocentering calibrations' 257. The values of these input variables can be predetermined and stored in a memory device for use by internal algorithms. The 'external frequency signal conditioning calibrations' 242 input can include a 'left index mark', a 'right index mark', a 'dig steer rotation', and a 'steer low-pass filter (LPF) coefficient' as described later in FIG. 3.

In one embodiment of the invention, the 'SAD' algorithm 200 can be broken down into the distinct functional algorithms or blocks, 'external frequency signal conditioning' 240 and 'centered steering angle determination' 260.

In the embodiment of FIG. 2, it is assumed in that the flag bits that denote activation of the 'diagnostics degraded modes' 220 can be set and cleared by generic diagnostic routines as a function of any fault conditions that can affect the 'SAD' algorithm 200. Additionally for one embodiment, all software associated with the 'SAD' algorithm 200 can be executed once every 10 Ms. one embodiment, the 'SAD' algorithm 200 power-up initialization occurs when the 'control module' 130 has been in a low current shutdown mode and a wake-up occurs, such as starting the host vehicle. After the control module's 130 software has performed generic power-up initialization and calibration upload functions, the status of the 'SAD' algorithm 200 can be initialized where all steering sensor faults can be assumed inactive until re-detected, and all intermediate variables can be initialized appropriately to allow for smooth start-up of the 'SAD' algorithm 200.

Figure 3:
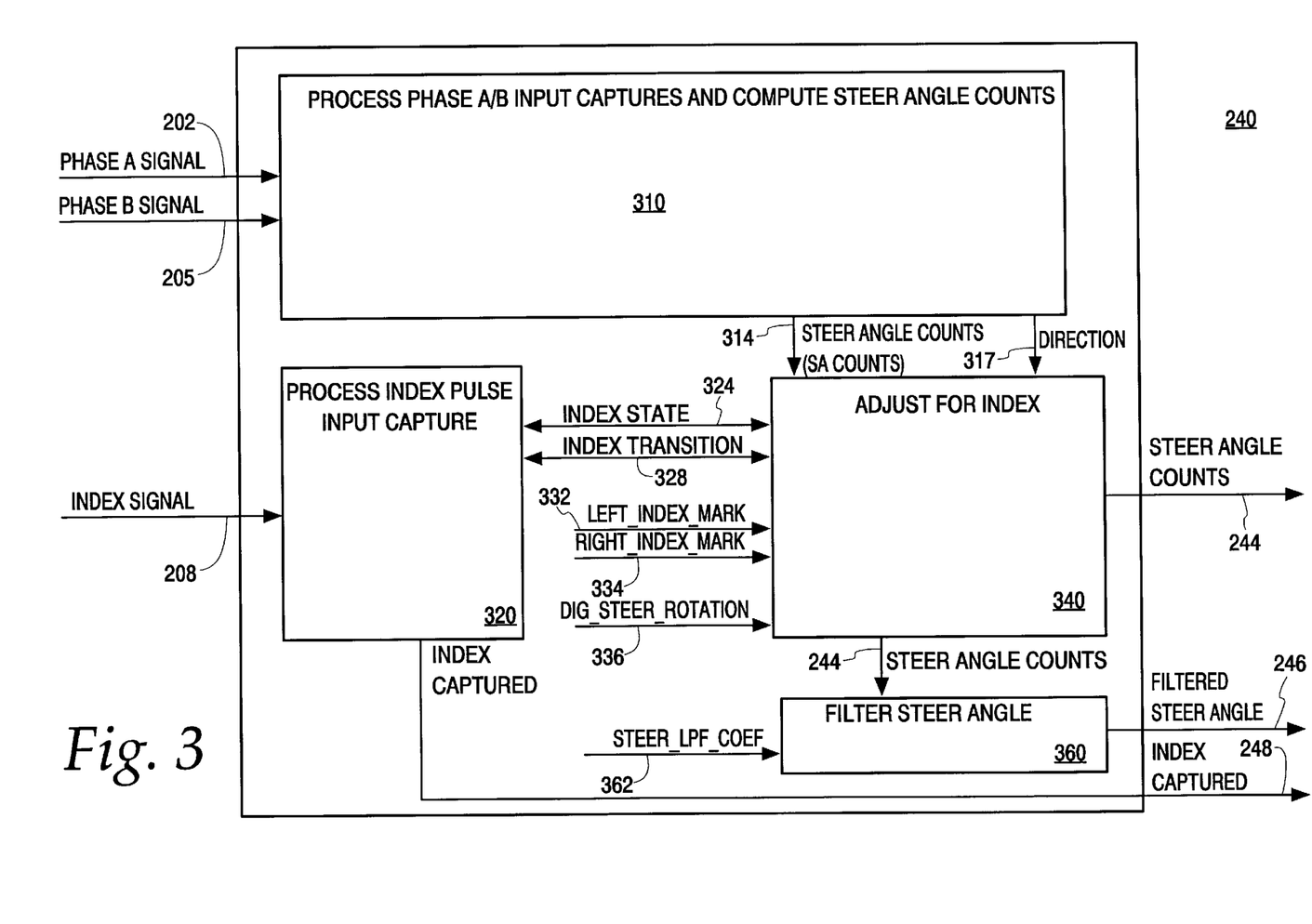
FIG. 3 is a block diagram of one embodiment of a 'external frequency signal conditioning' algorithm imbedded in the 'steering angle determination' module of FIG. 2 in accordance with the invention.

FIG. 3 is a block diagram of one embodiment of the 'external frequency signal conditioning' algorithm 240 of the 'SAD' algorithm 200, and illustrated are all inputs and outputs, as well as the most significant internal variables for this embodiment. The 'external frequency signal conditioning' algorithm 240 can include the functional modules or algorithms 'process phase A/B input captures' (process phase A/B input captures and compute steer angle counts) 310, 'process index pulse input capture' 320, 'adjust for index' 340, and 'filter steer angle' 360.

In one embodiment of the invention, the 'process phase A/B input captures' routine 310 can be called every time an interrupt occurs on either 'phase A pulse' 202 or 'phase B pulse' 205. The 'phase A pulse' 202 and 'phase B pulse' 205 input state can be read and used to determine the steer angle counts and direction variables. The steer angle counts can be incremented or decremented each time an interrupt occurs. The direction variable can be either left or right, depending on which phase the interrupt has occurred and at which output level.

In another embodiment, phase A/B interrupt enable flags can be used to disable an interrupt until an interrupt of the other phase occurs. The mechanism prevents a single interrupt from toggling back and forth on very slight sensor movement. Additionally, one embodiment of the 'process phase A/B input captures' 310 may use the following logic or equivalent.

Read A state from phase A pulse (hardware)
Read B state from phase B pulse (hardware)
If phase A interrupt occurred then
    Phase A interrupt enable flag=disable
    Phase B interrupt enable flag=enable
    Clear digital steer sensor diagnostic timer
    If (A state=B sate) then
        Increment steer angle counts
        Direction=right
    Else
        Decrement steer angle counts
        Direction=left
    Endif
Endif
If phase B interrupt occurred then
    Phase A interrupt enable flag=enable
    Phase B interrupt enable flag=disable
    Clear digital steer sensor diagnostic timer
    If (A state=B state) then
        Decrement steer angle counts
        Direction=left
    Else
        Increment steer angle counts
        Direction=right
    Endif
Endif The outputs of the 'process phase A/B input captures' 310 can be 'steer angle counts' 314 and 'direction' 317. The outputs can then be passed as inputs to the 'adjust for index' 340.

In one embodiment of the invention, a 'process index pulse input capture' 320 algorithm can be executed within the 'external frequency signal conditioning' 240 every time a 'phase A/B input capture occurs. Input capture is a technique known in the art and is hardware determined. A 'index pulse' 208 can be processed by the 'process index pulse input capture' 320 producing a 'index state' 324 that is used to synchronize the steering angle counts in the 'adjust for index' 340. The 'process index pulse input capture' 320, can also determine if an index track value is high or low. An index track is the value of the 'index pulse' 208 once captured and is said to be HIGH for every value +/−10 about the center of the 'digital steer sensor' 110. The index track is said to be LOW for the remainder of the rotation of the 'digital steer sensor' 110. Therefore, a transition can occur every time the 'digital steer sensor' 110 rotates and crosses the +/−10 threshold. The transitions can be Low to High or High to Low depending on the rotational direction and location.

For one embodiment, an additional output of the 'process index pulse input capture' 320 can be the 'index transition' 328 flag, which becomes active when a transition has occurred. The 'index transition' 328 will be reset by the 'adjust for index' 340. A index captured output within the 'process index pulse input capture' 320 can be a one shot flag that will become and stay active once the first 'index transition' 328 value occurs. To achieve the 'index state' 324 and 'index transition' 328 outputs, one embodiment of the 'process index pulse input capture' 320 may implement the following logic, or equivalent.

Initialization of Routine/Controller
Index Captured=No
Index Transition=No
Normal Operation
Read index state from index pulse (hardware)
If (index state≠old index state) then
   Index transition=Yes
   Index captured=Yes
Else
   Index transition=No
Endif
Old index state=index state Every time an 'index transition' 328 occurs, the 'steer angle counts' 314 are re-synchronized within the 'adjust for index' 340. For index LOW to HIGH transition, the 'right index mark' 334 is sensed when turning left, and the 'left index mark' 332 is sensed when turning right. For index HIGH to LOW transition, the 'right index mark' 334 is sensed when turning right, and the 'left index mark' 332 is sensed when turning left. A 'dig steer rotation' 336 input defines the degree of steering rotation less then 360, and may also be used by the 'adjust for index' 340. To determine the steer angle count re-synchronized value, one embodiment of the 'adjust for index' 340 may implement the following logic, or equivalent.

If (index transition=Yes) then
  If (direction=left) AND (index state=high) then
    Temp=right_index_mark
  Elseif (direction=right) AND (index state=low) then
    Temp=right_index_mark
  Else
    Temp=left_index_mark
  Endif
  If (steer angle counts<−dig_steer_rotation) then
    Steer angle counts=temp −360
  Elseif (steer angle counts<dig_steer_rotation) then
    Steer angle counts=temp
  Else
    Steer angle counts=temp+360
  Endif
  Index transition=No
Endif The resulting 'steering angle counts' 244 can have possible values within −370 counts to +370 counts, and can be passed as input values to a 'filter steer angle' 360 of the 'external frequency signal conditioning' 240 algorithm, and to the 'centered steering angle determination' 260 algorithm of the 'SAD' algorithm 200.

The 'filter steer angle' 360 of the 'external frequency signal conditioning' 240 can low-pass filter the 'steering angle counts' 244 to help smooth out the signal. To provide the low-pass filtering of the 'steering angle counts' 244, one embodiment of the 'filter steer angle' 360 can execute the following equations, or equivalent:

$$\text{Filtered steer angle }(n)=(\text{steer\_LPF\_coef}*\text{steer angle counts }(n))+((1-\text{steer\_LPF\_coef})*\text{filtered steer angle }(n-1)).$$

Because the 'steering LPF (low-pass filter) coefficient' 362 may be hardcoded to a value of 0.5, alternative embodiments of the invention may implement the LPF directly using arithmetic shift operations instead of multiplications, using the following equations, or equivalent:

$$\text{Filtered steer angle }(n)=0.5*\text{steer angle counts }(n)-0.5*\text{filtered steer angle }(n-1)+\text{filtered steer angle }(n-1).$$

The resulting 'filtered steer angle' 246 signal can be carried forward with a range appropriate to the range of a physical steering system. For example, ±720 equals two full steering wheel rotations.

With the process completion of the 'external frequency signal conditioning' 240, outputs 'steering wheel angle counts' 244, 'filtered steering wheel angle' 246, and 'index captured' 248' can be passed as inputs to the 'centered steering angle determination' 260 algorithm. In one embodiment as is shown in FIG. 4, the 'centered steering angle determination' 260 may be composed of a 'steering autocenter determination' 415 algorithm, a 'steering center ramp detection' 430 algorithm, and a 'centered steering wheel angle computation' 450 algorithm.

Figure 4:
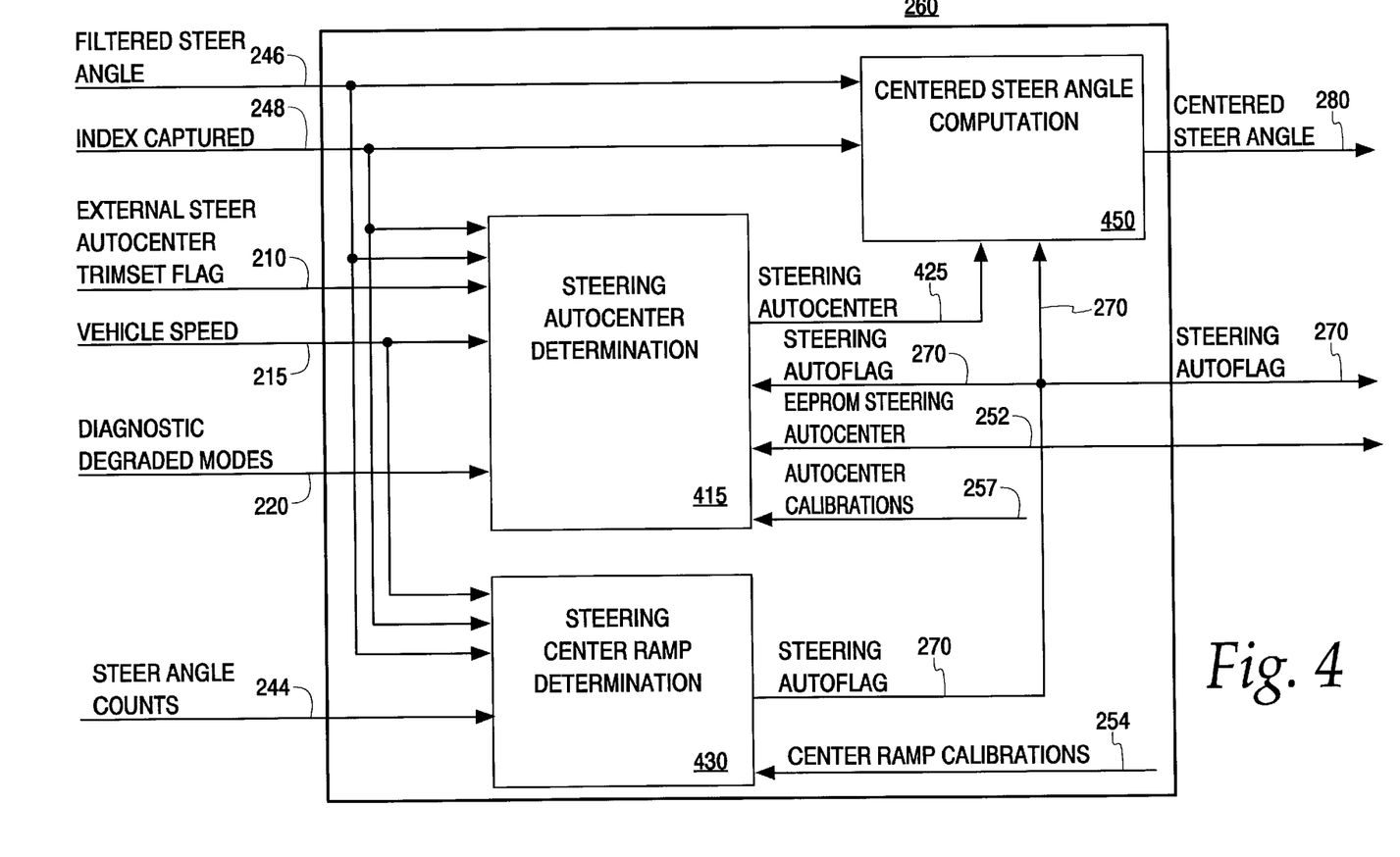
FIG. 4 is a block diagram of one embodiment of a 'centered steering angle determination' algorithm imbedded in the 'steering angle determination' module of FIG. 2 in accordance with the invention.

Illustrated in FIG. 4, one embodiment of the invention provides that the 'steering autocenter determination' 415 may require the inputs 'filtered steering angle' 246, 'vehicle speed' 215, 'external steering autocenter trimset flag' 210, 'diagnostic degraded modes' 220, 'EEPROM steering autocenter' 252, and the 'autocentering calibrations' 257. For one embodiment, the 'autocentering calibrations' 257 can be further comprised of a 'autocentering minimum vehicle speed (AC_Speed)', an 'autocentering angle band (AC_Angle_Band)', an 'autocentering time (AC_Time)', an 'autocentering multiple angle band (AC_Mult_Angle_Band)', an 'autocentering multiple count limit (AC_Mult_Count)', and a 'maximum EEPROM autocenter offset'.

The outputs of the 'steering autocenter determination' 415 can include a 'steering autocenter' 425, a 'steering autoflag' 270, and the 'EEPROM steering autocenter' 252. The 'EEPROM steering autocenter' 252 may be both an input and an output. This value can be used by the 'steering angle determination' 415 to store in memory a steering autocenter value across the 'controller module' 130 wake-up cycles.

In one embodiment of the 'steering angle determination' 415, a command from the 'external steering autocenter trimset flag' 210 may be received to instruct the 'steering angle determination' 415 to store the current value of the 'filtered steering angle' 246 as the 'EEPROM steering autocenter' value 252.

When one embodiment provides the 'external steering autocenter trimset flag' 210 set to (on), the 'SAD' algorithm 200 can react in one of two ways, both as a function of the status of a 'ignore steering autocenter command' provided by the 'diagnostics degraded modes' 220. If the 'ignore steering autocenter command' is active, one embodiment of the 'SAD' algorithm 200 may take no action in response to the 'external steering autocenter trimset flag' 210 command. Otherwise, the 'SAD' algorithm 200 can execute the 'external steering autocenter trimset flag' 210 command by taking the following actions:

Set the 'steering autocenter' 425 equal to the 'filtered steering angle' 246.

Set the 'steering autoflag' 270 (valid angle).

Attempt to program the 'EEPROM steering autocenter' 252 value to match the updated 'steering autocenter' 425.

Attempt to program the 'EEPROM steering autocenter' 252 checksum to equal the 1's complement of the updated 'steering autocenter' 425.

Wherein the 'steering autocenter' 425 value in 'a' is saved to computer memory in a manner known in the art, and the saved value is used as the updated 'EEPROM steering autocenter' 452 values for 'c' and 'd'. Regardless to which of the two above reactions are used, the 'external steering autocenter trimset flag' 210 can be cleared in order to prevent repeated execution of the above logic. In other words the flag, or equivalent mechanism, can be handled as a one-time execution. The external reply, handled outside the 'SAD' algorithm 200, can indicate what actions were taken in response to the 'external steering autocenter trimset flag' 210.

For another embodiment of the invention, the 'steering autocenter determination' 415 can be used to allow the 'controller module' 130 (in this embodiment, the controller module circuit memory) to "learn" the 'filtered steering angle' 246 value that corresponds to straight-line driving (centered steering wheel position) by providing corrected 'steering autocenter' 425 values to memory. Memory may be of any type known in the art, and may be non-volatile RAM for this embodiment. Non-volatile may be required to prevent loss of the learned value between ignition cycles. The 'steering autocenter determination' 415, the steering autocenter 425 and old steering autocenter variables can be initialized to equal the 'EEPROM steering autocenter' 252 during all reset types. After initialization (if required), the 'steering autocenter determination' 415 can execute the following equations and logic, or equivalent:

If (index captured=Yes) then
    If steering enable flag=0 then
        Autocenter one-time flag=0 (Inactive)
        Autocenter multiple one-time flag=0 (Inactive)
        Steering autoflag=0 (Inactive)
        Steering autocenter=EEPROM steering autocenter
        Old steering autocenter=EEPROM steering autocenter
        New autocenter found flag=0 (Inactive)
    Elseif autocenter one-time flag=0 (Inactive) then
        Autocenter one-time flag=1 (Active)
        Initial AC steering angle=filtered steering angle
        Autocenter counter=0
    Else
        Execute steering autocentering subroutine
    Endif
Endif The steering autocentering subroutine can execute the following equations and logic, or equivalent:
AC_Delta=filtered steering angle−initial ac steering angle
If [(vehicle speed>AC_Speed) AND (|AC_Delta|<AC_Angle_Band) then
    Increment autocenter counter
    If autocenter counter≧AC_Time then
        Autocenter one-time flag=0 (Inactive)

If autocenter multiple one-time=0 (Inactive) then
            Autocenter multiple one-time=1
            Initial multiple AC angle=filtered steering angle
            Autocenter multiple counter=1
        Else
            AC_Mult_Delta=filtered steering angle−initial multiple ac angle
            If |AC_Mult_Delta|<AC_Mult_Angle_Band then
                Increment autocenter multiple counter
                If autocenter multiple counter≧AC_Mult_Count then
                      Steering autocenter=filtered steering angle
                      Steering autoflag=1 (Active)
                      New autocenter found flag=1 (Active)
                      Autocenter multiple one-time=0 (Inactive)
                Endif
            Else
                Initial multiple AC angle=filtered steering angle
                Autocenter multiple counter=1
            Endif
        Endif
    Endif
Else
    Initial AC steering angle=filtered steering angle
    Autocenter counter=0
Endif The 'steering autocenter determination' 415 can at power down, update the 'EEPROM steering autocenter' 252 to equal the current value of the 'steering autocenter' 425 if the two differ by more than the 'maximum EEPROM autocenter offset calibration' value found in the autocenter calibrations 257. In one embodiment, the following equations and logic, or comparable, may be used:
Offset=steering autocenter−EEPROM steering autocenter
If |Offset|>maximum EEPROM autocenter offset then
    Program 'EEPROM steering autocenter' to equal steering autocenter
    Program 'EEPROM steering autocenter' checksum to equal 1's complement of
        steering autocenter
Endif The 'steering center ramp detection' 430 algorithm, in one embodiment, can be used to determine if the steering wheel position is within a threshold of the position relating to the 'EEPROM steering autocenter' 252. The 'steering center ramp detection' 430 assumes that it is not possible to drive above a defined vehicle speed for more than a defined time interval with a steering wheel angle that is outside the range −180° to +180°. The 'centered steering angle determination' 260 can execute the 'steering center ramp determination' 430 once an index edge has been captured.

The inputs for the 'steering center ramp determination' 430 include 'index captured' 248, 'filtered steer angle' 246, 'vehicle speed' 215, 'diagnostic degraded modes' 220, 'steer angle counts' 244, and the 'center ramp calibrations' 254. The 'center ramp calibrations' 254 can contain a 'center ramp minimum vehicle speed (Ramp_Speed)', a 'center ramp angle band (Ramp_Angle)', and a 'center ramp time (Ramp-Time)' values. The output of the processed 'steering center ramp determination' 430 is the 'steering autoflag' 270.

For one embodiment of the 'steering center ramp determination' 430, the following equations and logic, or equivalent can be executed:
If (Index Captured=Yes) then

```
If (steering enable flag=0) OR (disable steering ramp find
    degraded mode=1) then
    Center ramp one-time flag=0 (inactive)
Elseif center ramp one-time flag=0 (inactive) then
    Center ramp one-time flag=1 (active)
    Initial ramp steering angle=filtered steer angle
    Ramp counter=0
Else
    Ramp_Delta=filtered steer angle−initial ramp steering
        angle
    If [(Vehicle Speed>Ramp Speed) AND (|Ramp_
        Delta|<Ramp_Angle) then
        Increment ramp counter
        If ramp counter≧Ramp_Time then
            Center ramp one-time flag=0 (inactive)
            Steering autoflag=1 (active)
            If filtered steer angle >180° then
                Steer angle counts=steer angle counts−360
                Filtered Steer Angle=Filtered Steer Angle−360
                Filtered steer angle (n−1)=filtered steer angle
                    (n−1)−360
            Elseif filtered steer angle <−180° then
                Steer angle counts=steer angle counts+360
                Filtered steer angle=filtered steer angle+360
                Filtered steer angle (n−1)=filtered steer angle
                    (n−1)+360
            Endif
        Endif
    Else
        Initial ramp steering angle=filtered steer angle
        Ramp Counter=0
    Endif
    Endif
Endif
```

Upon processing the 'steering center ramp determination' 430, the 'steering autoflag' 270 can be made available to the 'steering autocenter determination' 415, and the 'centered steer angle computation' 450 algorithm as an input.

The 'centered steering angle computation' 450, can calculate a 'centered steering angle' 280 by subtracting the 'steering autocenter' 425 from the current 'filtered steer angle' 246 value once a valid autocenter has been determined. One embodiment of the 'centered steering angle computation' 450 may use the following equations and logic, or equivalent:

```
If (index captured flag=Yes) AND (steering autocenter valid
    flag=Yes) then
    Centered steer angle=filtered steer angle−steering auto-
        center
Else
    Centered steer angle=0
Endif
```

With the determination of the 'centered steer angle' 280 complete, one embodiment of the 'SAD' algorithm 200 concludes and can provide the 'centered steer angle' 280 or any combination of the above outputs to the 'controller module' 130, or any other embodiment requiring a defined value for a centered steering wheel angle or its components.

The above-described implementations and algorithms of the invention are example implementations and algorithms. These implementations and algorithms illustrate one possible approach for modular implementation of the 'SAD' algorithm 200. The actual implementation may vary from the structure that is illustrated. Moreover, various other improvements and modifications to this invention may occur to those skilled in the art, and those improvements and modifications will fall within the scope of this invention as set forth below.

What is claimed is:

1. A method of determining a vehicle steering wheel angle comprising:
   receiving at least one steering sensor output;
   receiving a vehicle speed signal; and
   determining a centered steering angle based on the received vehicle speed signal and the at least one steering sensor output irrespective of the vehicle speed indicated by the vehicle speed signal.

2. The method of claim 1 further comprising:
   determining a filtered steering angle based on the steering sensor output; and
   determining the centered steering angle based on the filtered steering angle.

3. The method of claim 1 wherein the steering sensor output includes a phase A, a phase B, and a index signal.

4. The method of claim 3 further comprising determining the center steering angle based on the index signal.

5. The method of claim 3 further comprising determining a filtered steering angle based on the phase A, phase B, and index signals.

6. The method of claim 5 further comprising determining the centered steering angle based on the filtered steering angle and vehicle speed signal.

7. The method of claim 3 further comprising: determining an index captured value based on the index signal.

8. The method of claim 7 further comprising: determining the centered steering angle based on the index captured value.

9. The method of claim 1 further comprising: determining a centered steering wheel position as a function of the filtered steering angle, the vehicle speed signal, and a predefined time.

10. The method of claim 9 wherein the centered steering wheel position is stored in non-volatile memory.

11. The method of claim 10 wherein the stored centered steering wheel position is retrieved and used in determining the centered steering angle.

12. The method of claim 10 wherein an external command is used to allow the stored center steering wheel position to be rewritten.

13. The method of claim 1 wherein the steering sensor output is provided by at least one steering sensor.

14. The method of claim 1 wherein the steering sensor output is digital.

15. The method of claim 14 wherein the digital steering sensor output is provided by a quadrature sensor.

16. The method of claim 1 further comprising providing the centered steering angle to at least one vehicle control module.

17. The method of claim 1 further comprising receiving a diagnostics degraded modes signal, wherein the diagnostics degraded modes determines any failure within the steering sensor output.

18. The method of claim 1 wherein the centered steering angle is determined as a function of a centered steering angle determination algorithm.

19. The method of claim 18 wherein the centered steering angle determination algorithm is initialized from an inactive state.

20. The method of claim 18 wherein a steering autocenter determination algorithm, a steering center ramp determination algorithm, and a centered steer angle computation algorithm define the centered steering angle determination algorithm.

21. The method of claim 1 wherein the centered steering angle is determined as a function of an external frequency signal conditioning algorithm, and a centered steering angle determination algorithm.

22. The method of claim 21 wherein a process phase A/B input captures algorithm, a process index pulse input capture algorithm, an adjust for index algorithm, and a filter steer angle algorithm define the external frequency signal conditioning algorithm.

23. The method of claim 20 wherein the steering autocenter determination algorithm provides a steering autocenter value that corresponds to straight-line driving.

24. A system for determining a vehicle steering wheel angle comprising:

means for receiving at least one steering sensor output;

means for receiving a vehicle speed signal; and means for determining a centered steering angle based on the received vehicle speed signal and the steering sensor output irrespective of the vehicle speed indicated by the vehicle speed signal.

25. A computer readable medium storing a computer program comprising:

computer readable code for receiving at least one steering sensor output;

computer readable code for receiving a vehicle speed signal; and computer readable code for determining a centered steering angle based on the received vehicle speed signal and the steering sensor output irrespective of the vehicle speed indicated by the vehicle speed signal.

26. A method of determining a vehicle steering wheel angle, said method comprising:

receiving at least one steering sensor output;

receiving a vehicle speed signal; and executing an external frequency signal conditioning algorithm and a centered steering angle determination algorithm to determine a centered steering angle in response to a reception of the at least one steering sensor output and the vehicle speed signal.

27. A system of determining a vehicle steering wheel angle, said system comprising:

an external frequency signal module; and a centered steering angle determination module, wherein said external frequency signal module and said centered steering angle determination module are operable to collectively determine a centered steering angle in response to a reception of at least one steering sensor output and a vehicle speed signal by said system.

28. The system of claim 27, wherein said external frequency signal module includes means for outputting at least one signal indicative of a steering angle as a function of the at least one steering sensor output; and said centered steering angle determination module includes means for outputting the centered steering angle as a function of the vehicle speed signal and the at least one signal indicative of a steering angle.

* * * * *